G. J. Bentley,
Making Hoops.
N° 46,439. Patented Feb. 21, 1865.
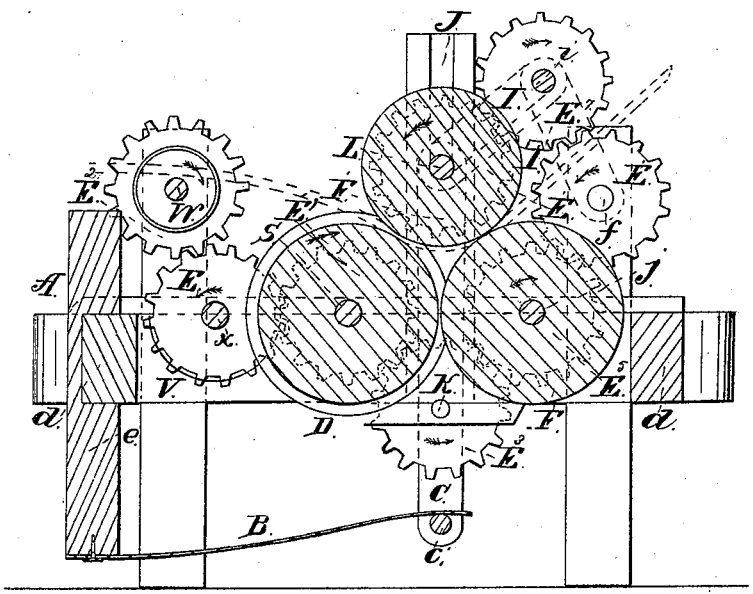
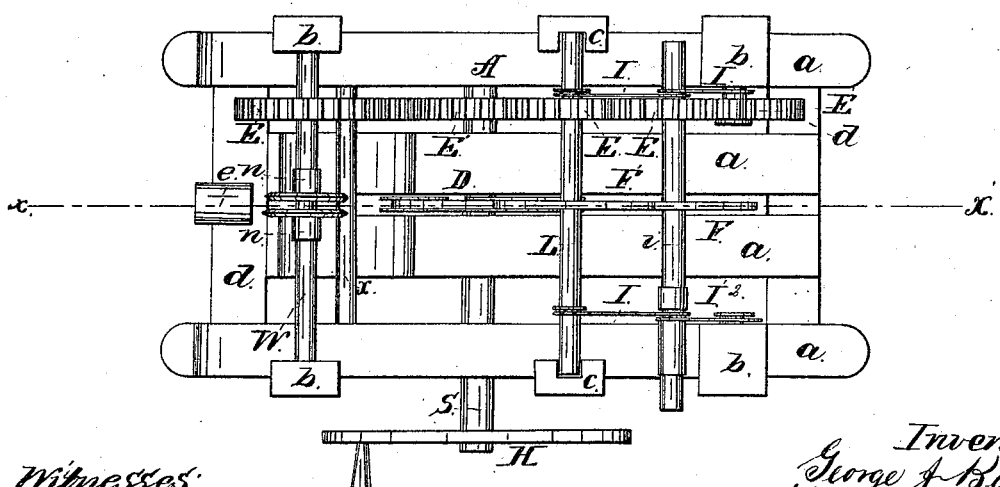
Witnesses:
C. L. Topliff
Henry Morris
Inventor:
George J. Bentley
per Munn & Co
Attorneys

UNITED STATES PATENT OFFICE.

GEORGE J. BENTLEY, OF MICHIGAN CITY, INDIANA.

IMPROVEMENT IN MACHINES FOR RIVING HOOPS.

Specification forming part of Letters Patent No. 46,439, dated February 21, 1865.

*To all whom it may concern:*

Be it known that I, GEORGE J. BENTLEY, of Michigan City, in the county of La Porte and State of Indiana, have invented a new and useful Improvement in Machines for Riving or Splitting Hoops and Making the Same from Bars of Wood; and I do hereby declare that the following is a full, clear, and exact description thereof, which will enable others skilled in the art to make and use the same, reference being had to the accompanying drawings, forming part of this specification, in which—

Figure 1 shows a plan of the machine; Fig. 2, an elevation of a section of the same on the line $x\ x$ in Fig. 1.

Similar letters of reference indicate like parts.

The frame A of the machine is to be made of wood or any other suitable material, but very strong, with beams $a$ within the frame of like strength with the side pieces $a$. The middle beams $a$ are connected to the cross-pieces $d$, and are cut away a portion of their depth at $v$ to make room for the shaft $x$.

H is a crank-wheel or gearing, through which power is applied to the machine. It is keyed to a shaft, S, which may run across the frame and have bearings in each beam $a$, or may stop short of the side piece $a$ on the left side of the machine. A cogged gear-wheel, E′, mounted on the inner end of the shaft, drives the cogged wheels E E′ $E^2$ $E^3$ $E^4$ $E^5$ $E^6$ $E^7$, and through them their several shafts, as shown in the drawings.

Upon the shaft S and between the center beams $a$ is keyed a grooved wheel, D, whose groove is made by securing metallic disks upon each side of a wheel of smaller diameter than the disks, the grooves thus made having the periphery of the inner wheel for its bed and the straight projecting portions of the disks for its sides. A shaft, $j$, driven by the cogged wheel $E^5$, and having bearings in the center and in one of the side pieces $a$, carries a disk, F, whose periphery runs within the grooved wheel D. Another disk-wheel, F′, is mounted upon a shaft, L, driven by the cogged wheel $E^4$. This disk F also runs within the groove of the wheel D, the axis of its shaft being placed in a vertical plane projecting between the peripheries of the disk-wheel F and the grooved wheel D. The shaft L runs in grooves cut down the inner faces of the uprights $c$, and it is sustained in bearings cut in hanging bearings I, which at their upper ends embrace and sustain the shaft $i$ of the cogged wheel $E^7$. Other hanging bearings, I′, also embracing the shaft $i$, extend down to studs 2 and $f$, fixed to the inner faces of the standards $b$, the studs $f$ serving also as a journal for the cogged wheel $E^6$. These hanging bearings I′ are of such a length as to lie in a plane at right angles with the plane of the bearings I from each end of the shaft L, but within the framing of the machine. Metallic straps C extend down toward the flooring, and are connected at their lower ends by means of a rod, $c'$. A spring, B, fastened beneath a post, $e$, fixed midway on the front cross-piece of the machine, bears down upon the rod $c'$, thereby drawing the shaft L downward along the grooves in the uprights $c$, and of course pressing the disk F′ down within the groove of the wheel D and upon the periphery of the disk F. The shaft W, carrying the cogged wheel $E^2$, is journaled within the standards $b$, and two friction-rollers, $n$, are fixed thereon, to guide the stock to the grooved wheel D. It will be seen that the hanging bearings are respectively equal in length to the sum of the radii of the wheels to which they are connected, and that therefore the peripheries of the wheels will always remain in contact whatever elevation may be given to the shaft L.

In operating the machine, the bar to be split into hoops is placed between the guiding friction-wheels $n$, which are made with a sleeve to each, so that they can be fixed at varying distances to suit different-sized hoops, and so advanced to the groove of the wheel D, when it is seized by the bite of the upper pressure-disk, F′, and bent down into and forced through the angle formed by the wheel D and the disk-wheels F′ and F, as seen in the figure in red lines. A weight may be used instead of a spring to give pressure to the disk F′. I employ a pressure of about one thousand pounds, more or less. The bar of wood to be split is sawed out of a proper width for the size of hoop to be made, and one of its ends is to be checked with a gang of circular-saws or in any other convenient manner. It is then ready for the machine, the great pressure put upon it therein causing the bar to be divided in the plane of the checks in its end. I also use the same machine for making basket-splints.

A machine I have now in use splits about nine thousand barrel-hoops per hour with a pressure of about one thousand pounds.

Having thus described my invention, I claim as new and desire to secure by Letters Patent—

The combination of the grooved wheel D with the disks F and F', the latter being suspended in hanging bearings, substantially as described, and for the purposes set forth.

GEORGE J. BENTLEY.

Witnesses:
   D. J. BALDWIN,
   JOHN KRUGER.